(12) United States Patent
Barzen et al.

(10) Patent No.: US 9,616,779 B2
(45) Date of Patent: Apr. 11, 2017

(54) SEAT ASSEMBLY HAVING A LATCH MECHANISM

(71) Applicant: LEAR CORPORATION, Southfield, MI (US)

(72) Inventors: Johannes Barzen, Pfaffenhofen (DE); Eckhard Nock, Wolnzach (DE); Alexej Niederhaus, Velden (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/884,123

(22) Filed: Oct. 15, 2015

(65) Prior Publication Data
US 2016/0107546 A1   Apr. 21, 2016

Related U.S. Application Data
(60) Provisional application No. 62/066,117, filed on Oct. 20, 2014.

(30) Foreign Application Priority Data

Jun. 25, 2015  (DE) .......................... 10 2015 211 811

(51) Int. Cl.
*B60N 2/22*     (2006.01)
*B60N 2/44*     (2006.01)
*B60N 2/20*     (2006.01)

(52) U.S. Cl.
CPC ........... *B60N 2/2222* (2013.01); *B60N 2/206* (2013.01); *B60N 2/2245* (2013.01); *B60N 2/4435* (2013.01)

(58) Field of Classification Search
CPC .... B60N 2/206; B60N 2/2222; B60N 2/2245; B60N 2/4435; B60N 2/36; B60N 2/366
See application file for complete search history.

(56) References Cited

U.S. PATENT DOCUMENTS

| | | | |
|---|---|---|---|
| 6,491,346 B1 * | 12/2002 | Gupta | ................. B29C 49/4802 297/232 |
| 7,044,552 B2 | 5/2006 | Mueller et al. | |
| 7,152,926 B2 | 12/2006 | Wrobel | |
| 7,226,129 B2 | 6/2007 | Brandes et al. | |
| 7,455,336 B2 | 11/2008 | Baumchen et al. | |
| 7,758,129 B2 * | 7/2010 | Maruno | ................. B60N 2/015 296/65.09 |
| 8,186,759 B2 | 5/2012 | Vedder | |
| 8,226,169 B2 | 7/2012 | Kreuels et al. | |
| 8,905,475 B2 * | 12/2014 | Schenten | ............. B60N 2/2245 297/232 |
| 2006/0208505 A1 | 9/2006 | Christoffel et al. | |

(Continued)

FOREIGN PATENT DOCUMENTS

| | | |
|---|---|---|
| DE | 102004021516 A1 | 11/2005 |
| DE | 102006021887 A1 | 11/2007 |

(Continued)

*Primary Examiner* — Philip Gabler
(74) *Attorney, Agent, or Firm* — Brooks Kushman P.C.

(57) ABSTRACT

A seat assembly having a seat back that may include first and second seat back portions that may be configured to rotate about an axis. A striker may be disposed on the first seat back portion. A latch mechanism may be disposed on the second seat back portion. The first seat back portion may not rotate with respect to the second seat back portion when the latch mechanism receives the striker.

20 Claims, 7 Drawing Sheets

(56) References Cited

U.S. PATENT DOCUMENTS

| | | | |
|---|---|---|---|
| 2011/0006577 A1 | 1/2011 | Mueller et al. | |
| 2012/0133188 A1* | 5/2012 | Wieclawski | B60N 2/2245 297/378.13 |
| 2013/0307307 A1 | 11/2013 | Mueller et al. | |
| 2014/0070589 A1 | 3/2014 | Teufel et al. | |
| 2014/0145057 A1* | 5/2014 | Sayama | B60N 2/2245 248/503.1 |
| 2014/0197670 A1* | 7/2014 | Freijy | B60N 2/22 297/354.12 |
| 2014/0306507 A1* | 10/2014 | Mueller | B60N 2/01583 297/463.1 |

FOREIGN PATENT DOCUMENTS

| | | | |
|---|---|---|---|
| DE | 102013200292 | * | 7/2014 |
| WO | 2012143102 A1 | | 10/2012 |

* cited by examiner

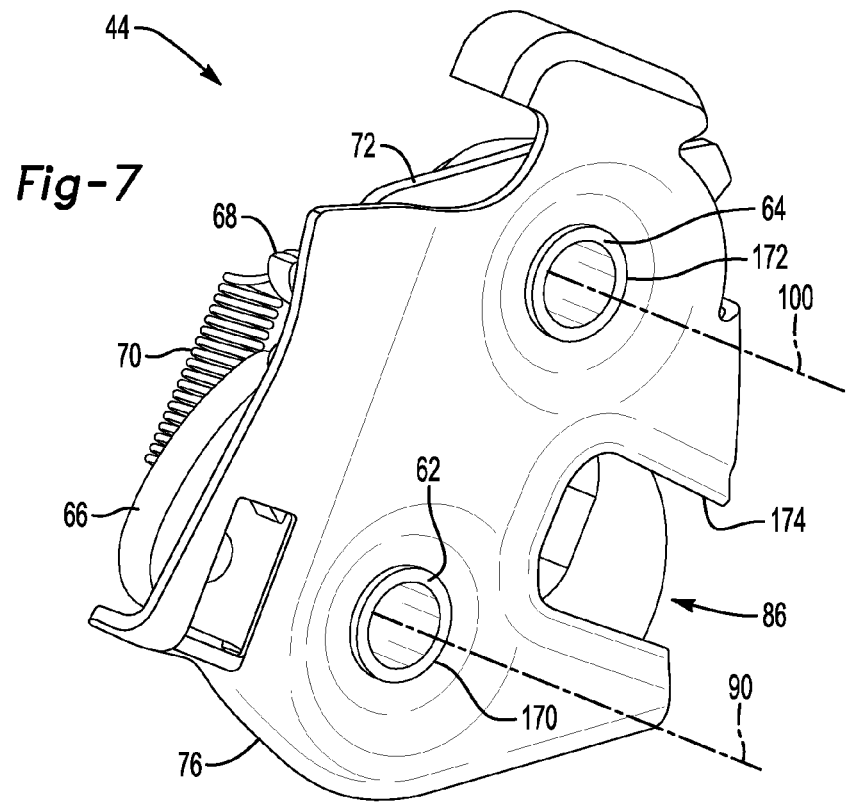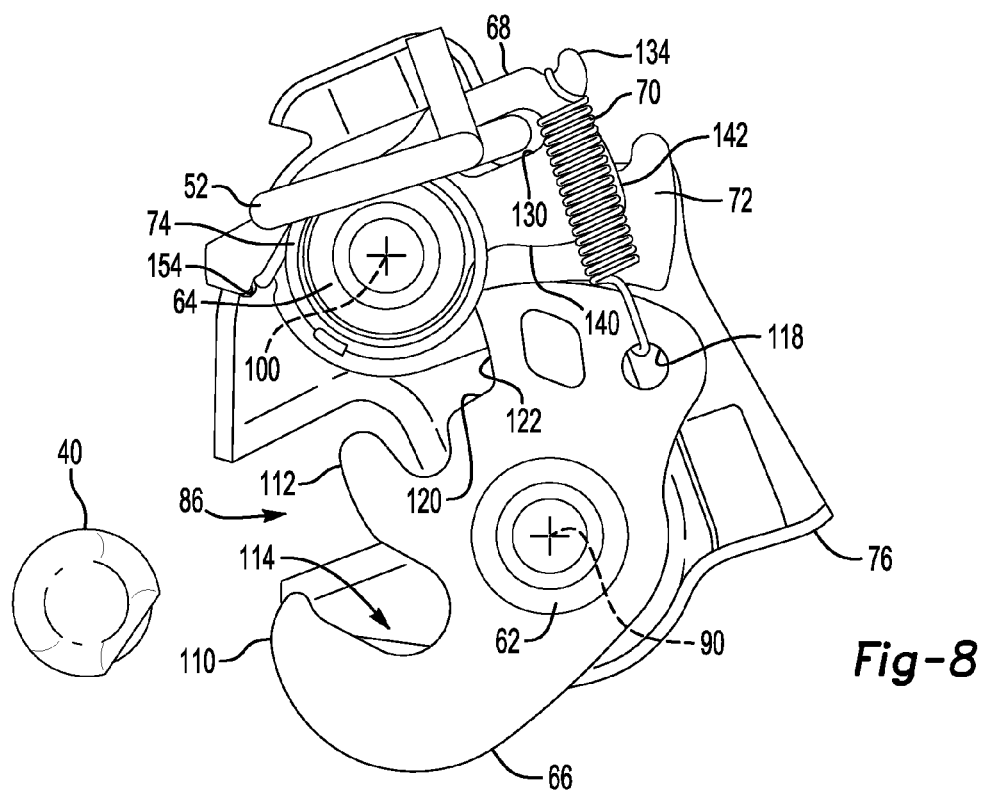

SEAT ASSEMBLY HAVING A LATCH MECHANISM

CROSS-REFERENCE TO RELATED APPLICATIONS

This application claims the benefit of U.S. provisional application Ser. No. 62/066,117, filed Oct. 20, 2014, the disclosure of which is hereby incorporated in its entirety by reference herein.

TECHNICAL FIELD

This patent application relates to a seat assembly having a latch mechanism.

BACKGROUND

A latching system associated with a seat is disclosed in U.S. Patent Publication No. 2012/0133188.

SUMMARY

In at least one embodiment, a seat assembly is provided. The seat assembly may include a first seat back portion, a second seat back portion, a latch release mechanism, and a latch mechanism. The first seat back portion may be pivotable about an axis and may have a striker. The second seat back portion may be pivotable about the axis and may be disposed adjacent to the first seat back portion. The latch release mechanism may be disposed on the second seat back portion and may have an actuating shaft. The latch mechanism may be disposed on the second seat back portion and may have a pawl, a catching cam, and a clamping cam. The pawl may rotate about a first axis. The catching cam may rotate about a second axis and may have an actuating shaft opening that receives the actuating shaft. The clamping cam may rotate about the second axis and may have an actuating shaft opening that receives the actuating shaft. The actuating shaft may engage and rotate the catching cam before engaging and rotating the clamping cam to actuate the pawl from a closed position to an open position.

In at least one embodiment, a seat assembly is provided. The seat assembly may include a first seat back portion, a second seat back portion, a latch release mechanism, and a latch mechanism. The first seat back portion and the second seat back portion may be pivotable about an axis. The first seat back portion may have a striker. The latch release mechanism may be disposed on the seat back portion and may have a release handle and an actuating shaft. The latch mechanism may include a reinforcement plate, a cover plate, a pawl, a catching cam, and a clamping cam. The reinforcement plate may be disposed on the second seat back portion. The cover plate may be fixedly positioned with respect to the reinforcement plate. The pawl may be disposed between the reinforcement plate and the cover plate. The pawl may move between an open position and a closed position. The pawl may have a pin that may be spaced apart from a perimeter of the pawl. The catching cam may be disposed between the reinforcement plate and the cover plate. The catching cam may engage the pawl when the pawl is in the closed position. The clamping cam may be disposed between the catching cam and the cover plate. The clamping cam may engage the pin to inhibit rotation of the pawl.

BRIEF DESCRIPTION OF THE DRAWINGS

FIGS. 6 and 7 are perspective views of the latch mechanism in a closed condition.

FIG. 8 is a side view of the latch mechanism in the open condition a prior to receiving the striker with a reinforcement plate removed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
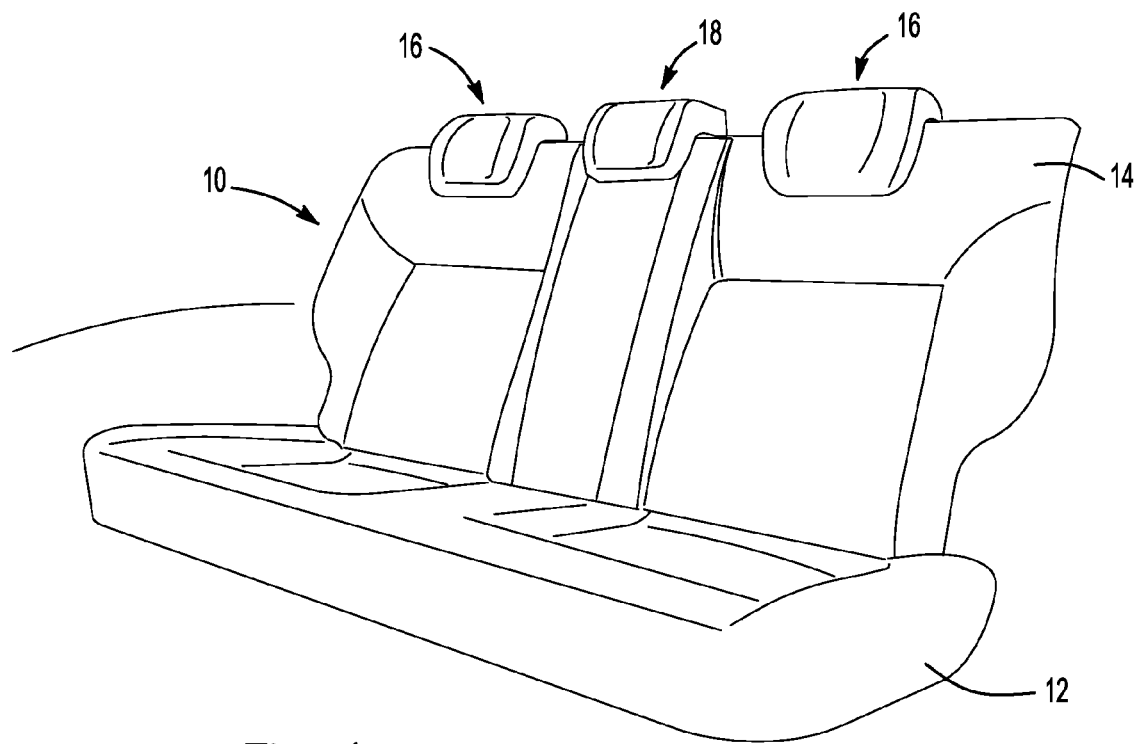
FIG. 1 is a perspective view of an exemplary seat assembly.

Referring to FIG. 1, an exemplary seat assembly 10 is shown. The seat assembly 10 may be provided with a vehicle, such as a motor vehicle like a car or truck. The seat assembly 10 may be configured as a rear seat that may be positioned behind a front seating row or front seat that may be occupied by a vehicle driver. The seat assembly 10 may include a seat bottom 12 and a seat back 14.

The seat bottom 12 may be configured to be mounted on a support surface, such as a floor pan of a vehicle. The seat bottom 12 may be configured to support a seat occupant.

The seat back 14 may be disposed proximate the seat bottom 12 and may be configured to support the back of a seat occupant. The seat back 14 or a portion thereof may be configured to pivot or rotate with respect to the seat bottom 12.

The seat bottom 12 and the seat back 14 may provide one or more seating positions. For instance, the seat assembly 10 may have one or more primary seating positions 16 and a secondary seating position 18. The secondary seating position 18 may be disposed between two primary seating positions 16 and may be located near or at the center of the seat assembly 10.

Figure 2:
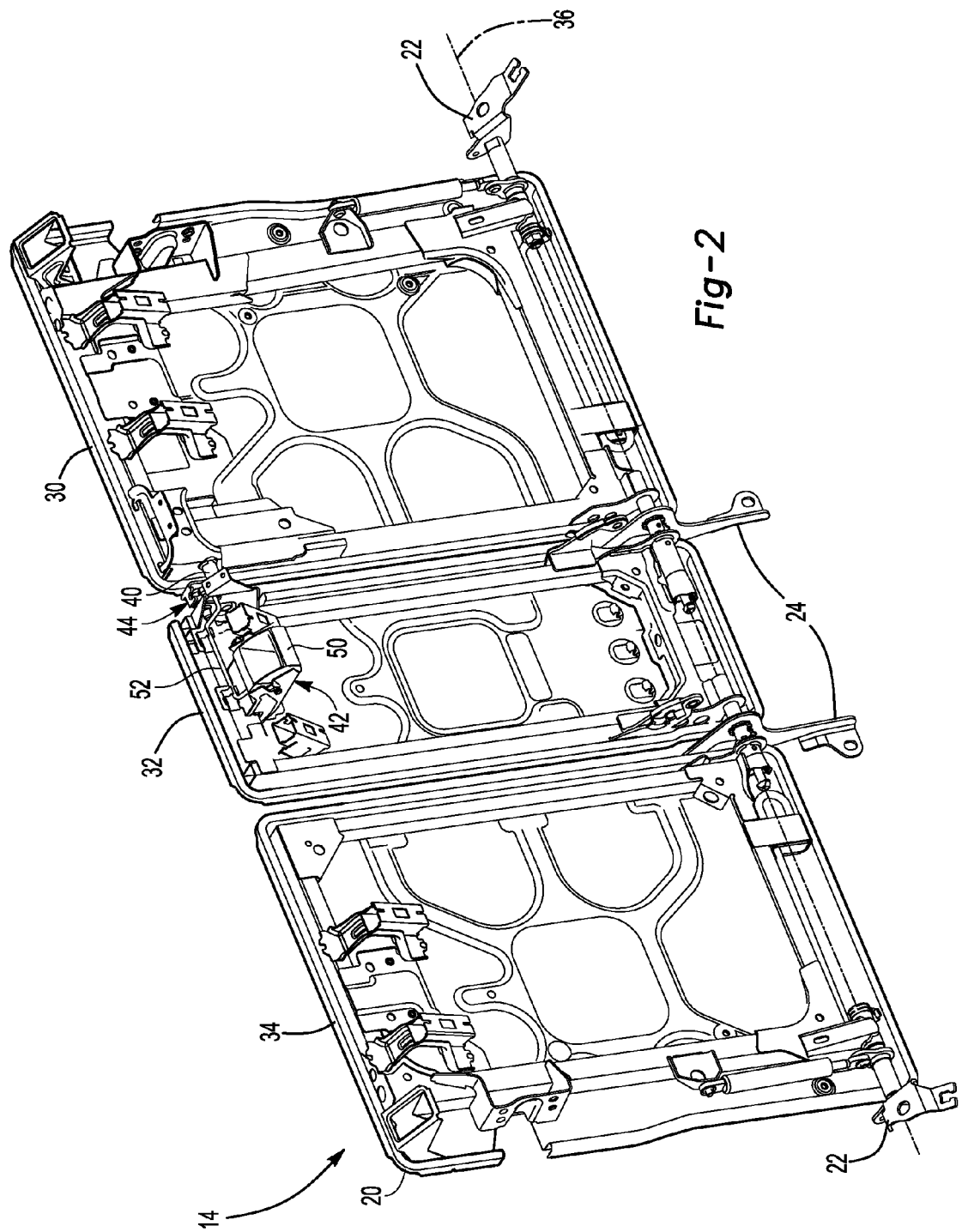
FIG. 2 is a perspective view of a seat back frame of the seat assembly.

Referring to FIG. 2, the seat back 14 is shown without a trim cover and seat cushions to more clearly illustrate a seat back frame 20 of the seat assembly 10.

The seat back frame 20 may be configured to be mounted to the vehicle. For example, the seat back frame 20 may be mounted to a vehicle body with a plurality of mounting brackets that may be fixedly disposed on the vehicle. In FIG. 2, two end mounting brackets 22 and two center mounting brackets 24 are shown; however, it is contemplated that a different number of mounting brackets may be provided.

The end mounting brackets 22 may be disposed proximate opposite ends of the seat back frame 20 and may be coupled to the vehicle body when installed in a vehicle. The center mounting bracket(s) 24 may be disposed between and may be spaced apart from the end mounting brackets 22 and may be coupled to part of the vehicle body, such as the floor pan, when installed in a vehicle.

Figure 3:
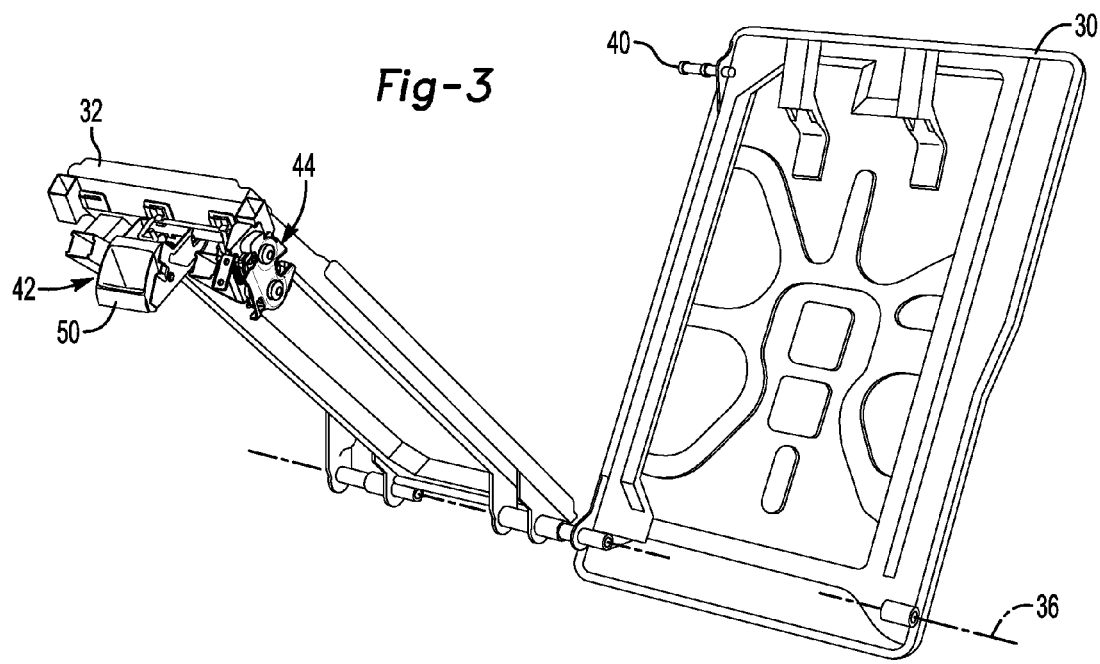
FIG. 3 is a perspective view of a portion of the seat back frame of FIG. 2 showing a center seat back portion in a partially folded position.

The seat back frame 20 may have multiple seat back portions that may be configured to pivot or rotate from a generally upright seating position shown in FIG. 2 to a folded position in which at least a portion of the seat back 14 and seat back frame 20 may be folded over the seat bottom 12 and may engage the seat bottom 12. An example of a portion of the seat back frame 20 that is at least partially folded is shown in FIG. 3. In FIG. 2, the seat back frame 20 has a 40/20/40 split configuration that may include a first seat back portion 30, a second seat back portion 32, and a third seat back portion 34. The first seat back portion 30, second seat back portion 32, and third seat back portion 34 may be configured to pivot or rotate about an axis 36. In addition, the seat back frame 20 may include a striker 40, a latch release mechanism 42, and a latch mechanism 44.

The first seat back portion 30 may be disposed opposite the third seat back portion 34. As such, the second seat back portion 32 may be disposed between and may separate the first seat back portion 30 from the third seat back portion 34. In FIG. 2, the first seat back portion 30 is shown to at the right of the seat back frame 20 and the third seat back portion 34 is shown at the left of the seat back frame 20; however, the positions of the first seat back portion 30 and the third seat back portion 34 could be reversed. The first seat back portion 30 and the third seat back portion 34 may each be configured to support a seat occupant when disposed in the seating position and may be configured to pivot or rotate about the axis 36 independently of each other. In addition, the first seat back portion 30 and the third seat back portion 34 may have similar sizes and may generally be mirror images of each other in one or more embodiments. Moreover, the first seat back portion 30 and the third seat back portion 34 may have a greater width than the second seat back portion 32.

Figure 4:
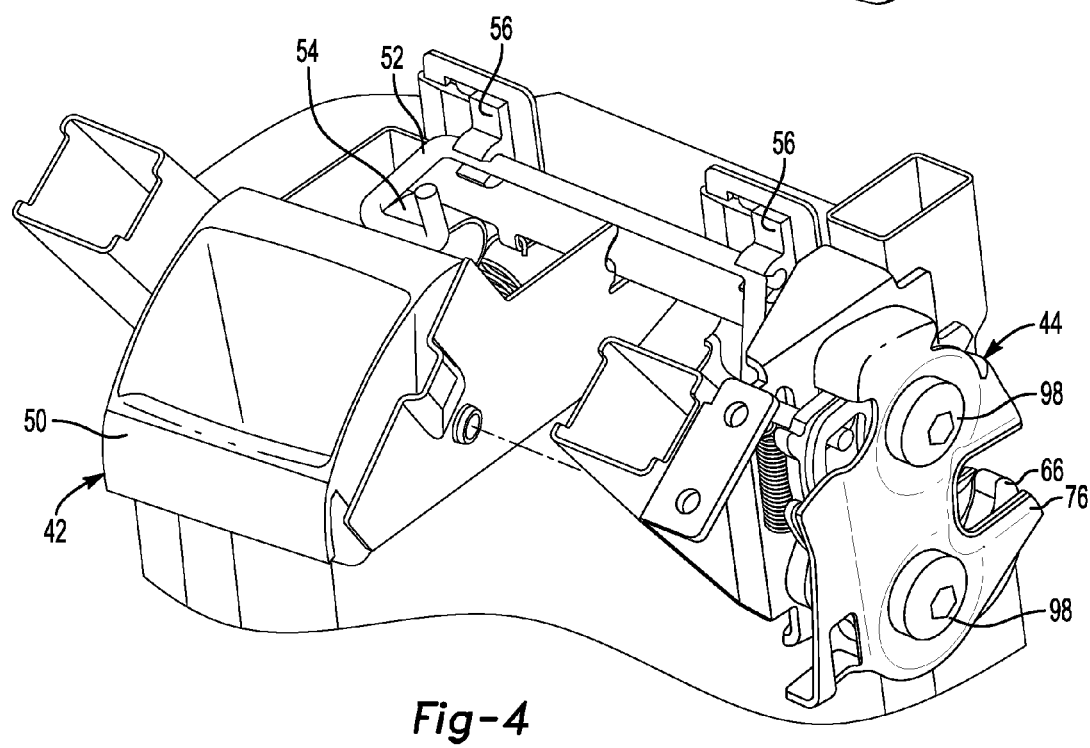
FIG. 4 is a magnified perspective view of the seat back frame showing a latch release mechanism and a latch mechanism.

Referring to FIGS. 2-4, the second seat back portion 32, which may also be referred to as a center portion or an armrest portion, may be disposed proximate the center of the seat back 14. The second seat back portion 32 may be disposed between and adjacent to the first seat back portion 30 and the third seat back portion 34. The second seat back portion 32 may be configured to rotate or pivot about the axis 36 independently of the first seat back portion 30, the third seat back portion 34, or both. As such, the second seat back portion 32 may be folded over the seat bottom 12 to provide an opening through the seat back 14 to an area behind the seat back 14 and/or to support an arm of a seat occupant that may be seated proximate the first seat back portion 30 or the third seat back portion 34. The second seat back portion 32 may rotate with the first seat back portion 30 about the axis 36 when the striker 40 is received in the latch mechanism 44 (e.g., when the second seat back portion 32 is latched to the first seat back portion 30) as will be discussed in more detail below. In addition, the second seat back portion 32 may rotate independently from the first seat back portion 30 when the striker 40 is not received in the latch mechanism 44. It is also contemplated that the second seat back portion 32 may be configured to support the back of a seat occupant that may be disposed between the first seat back portion 30 and the third seat back portion 34 in one or more embodiments.

Referring to FIGS. 2 and 3, the striker 40 may be provided with a seat back portion that does not include the latch mechanism 44. For instance, the striker 40 may be provided with the first seat back portion 30 or the third seat back portion 34. For brevity, the seat assembly 10 will be primarily described below with a configuration in which the striker 40 is disposed on the first seat back portion 30, such as is shown in FIGS. 2 and 3. The striker 40 may be fixedly disposed on the first seat back portion 30. For example, the striker 40 may be disposed proximate a top of the first seat back portion 30 and may extend toward the second seat back portion 32. The striker 40 may have any suitable configuration. For example, the striker 40 may be generally configured as a pin or shaft that may extend along a striker axis that may extend generally parallel to the axis 36.

Referring to FIG. 4, the latch release mechanism 42 may be configured to actuate the latch mechanism 44. The latch release mechanism 42 may be provided with a portion of the seat back 14 that may receive the latch mechanism 44, such as the second seat back portion 32. At least a portion of the latch release mechanism 42 may be disposed under a cover that may support a seat cushion and/or a trim cover. In at least one embodiment, the latch release mechanism 42 may include a release handle 50 and an actuating shaft 52.

The release handle 50 may facilitate manual actuation of the latch mechanism 44. For example, the release handle 50 may be disposed proximate a top of the second seat back portion 32 and may be operatively connected to the latch mechanism 44 via the actuating shaft 52. The release handle 50 may include a release handle arm 54 that may engage the actuating shaft 52. For instance, the release handle arm 54 may extend from the release handle 50 in a direction that may extend away from the front of the second seat back portion 32 and underneath an end portion of the actuating shaft 52. Force exerted on the release handle 50 may be transmitted to the latch mechanism 44 via the actuating shaft 52 to actuate the latch mechanism 44 from a closed condition to an open condition. For instance, the release handle 50 may pivot about an axis and the release handle arm 54 may move upward and cause the actuating shaft 52 to rotate when sufficient force is applied to the release handle 50.

The actuating shaft 52 may extend from the release handle 50 to the latch mechanism 44. The actuating shaft 52 may be moveably disposed on the second seat back portion 32, such as with one or more mounting clips 56. For example, the actuating shaft 52 may be received in and may rotate with respect to one or more mounting clips 56. The actuating shaft 52 may be disposed under a cover when the seat back 14 is fully assembled. The cover may support a seat cushion and/or a trim cover and may help separate the actuating shaft 52 from components of the seat back 14 so as not to impede movement or operation of the actuating shaft 52. A first end of the actuating shaft 52 may be disposed proximate and may engage the release handle 50. A second end of the actuating shaft 52 that may be disposed opposite the first end may be disposed proximate and may engage the latch mechanism 44. Actuating or pulling the release handle 50 may cause the actuating shaft 52 to rotate and actuate the latch mechanism 44 from a closed condition (shown in FIGS. 6, 10 and 11) in which the latch mechanism 44 may be secured to the striker 40 to an open condition (shown in FIGS. 4, 5, 8 and 9) in which the striker 40 may not be secured to the latch mechanism 44 and the second seat back portion 32 may be free to rotate about the axis 36 with respect to the first seat back portion 30.

Figure 5:
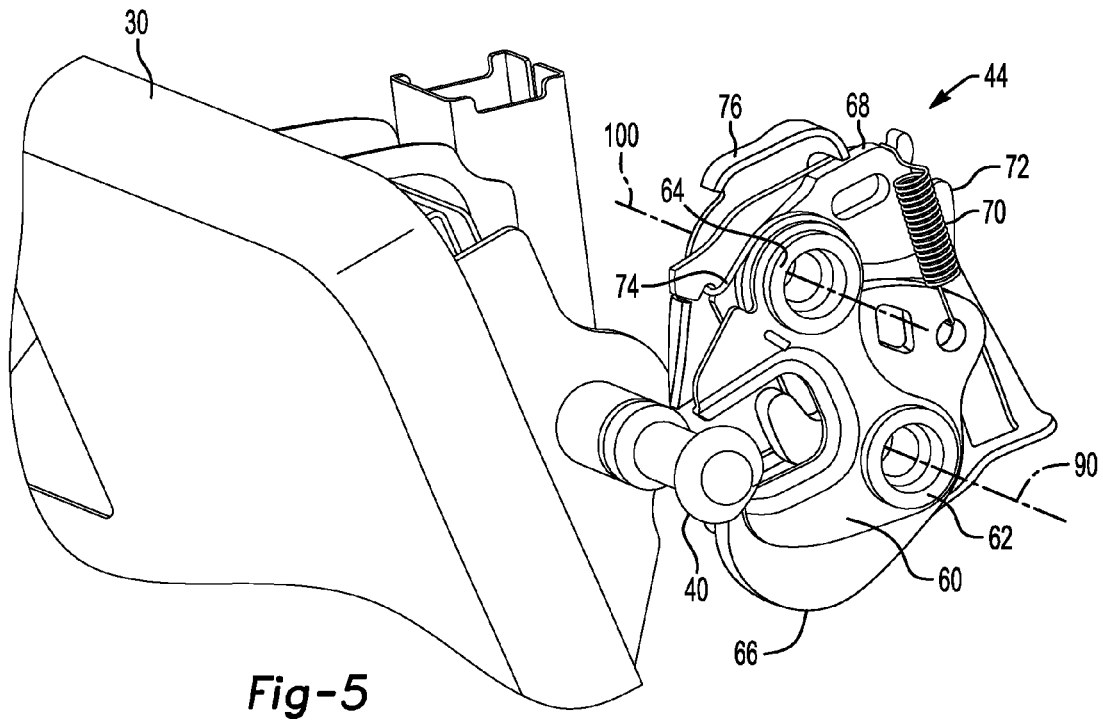
FIG. 5 is a perspective view of the latch mechanism in an open condition and an exemplary striker.

Referring to FIGS. 4 and 5, the latch mechanism 44 may selectively engage the striker 40 to inhibit the second seat back portion 32 from rotating about the axis 36 with respect to the first seat back portion 30. More specifically, the second seat back portion 32 may not rotate about the axis 36 with respect to the first seat back portion 30 when the latch mechanism 44 receives and grasps the striker 40, but may be free to pivot about the axis 36 with respect to the first seat back portion 30 when the latch mechanism 44 is opened and does not grasp the striker 40. The latch mechanism 44 may be disposed on the second seat back portion 32. For example, the latch mechanism 44 may be disposed proximate a side of the second seat back portion 32 that may be disposed near or adjacent to the striker 40. As such, the latch mechanism 44 may be aligned with the striker 40 and may be disposed near the top of the second seat back portion 32 in one or more embodiments. The latch mechanism 44 may not include an ejector mechanism or pretensioned spring that may abut and eject the striker 40 from the latch mechanism 44.

Figure 6:
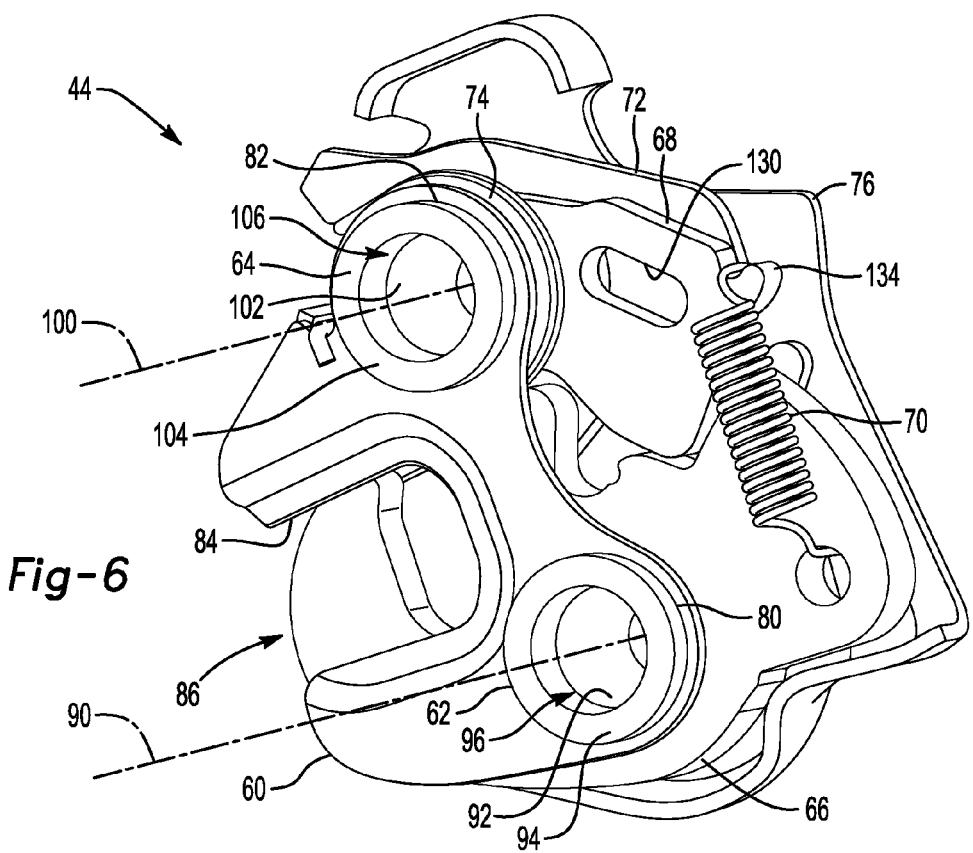

Referring to FIGS. 6 and 7, the latch mechanism 44 is shown in more detail. In at least one embodiment, the latch mechanism 44 may include a reinforcement plate 60, a first retainer 62, a second retainer 64, a pawl 66, a catching cam 68, a first biasing member 70, a clamping cam 72, a second biasing member 74, and a cover plate 76.

The reinforcement plate 60 may be disposed on the second seat back portion 32. For example, the reinforcement plate 60 may be disposed on a frame of the second seat back portion 32, or on a mounting bracket that may be fixedly disposed on a frame of the second seat back portion 32. As is best shown in FIG. 6, the reinforcement plate 60 may have a first reinforcement plate hole 80 and a second reinforcement plate hole 82. The first reinforcement plate hole 80 may receive the first retainer 62. The second reinforcement plate hole 82 may be spaced apart from the first reinforcement plate hole 80 and may receive the second retainer 64. The reinforcement plate 60 may have a roughly C-shaped configuration that may include a notch 84 or opening that may be generally disposed between the first reinforcement plate hole 80 and the second reinforcement plate hole 82 and that may receive the striker 40. The notch 84 may cooperate with a corresponding notch on the cover plate 76 to at least partially define a striker receiving opening 86. The reinforcement plate 60 may be made of any suitable material, such as a metal or metal alloy, and may not include any deformable stops that may be disposed proximate the notch 84 or engage the striker 40 or that may be made of a second material that may be more deformable than the metal or metal alloy.

The first retainer 62 may extend from the reinforcement plate 60 to the cover plate 76. The first retainer 62 may be disposed along a first axis 90 and may have a body 92 and a flange 94 that may cooperate to define a first retainer hole 96. The body 92 may be generally cylindrical. An end of the body 92 may be received in the first reinforcement plate hole 80. The flange 94 may be disposed at an end of the body 92 that is disposed proximate the cover plate 76. The flange 94 may extend away from the first axis 90 and may engage the cover plate 76 to inhibit axial movement of the first retainer 62. As is best shown in FIG. 4, a fastener 98 may extend through the first retainer hole 96 to couple the latch mechanism 44 to the second seat back portion 32 or a mounting bracket. The fastener 98 may have any suitable configuration. For example, the fastener 98 may be a screw, bolt, rivet, pin, or the like.

The second retainer 64 may have the same configuration as the first retainer 62. Like the first retainer 62, the second retainer 64 may extend from the reinforcement plate 60 to the cover plate 76. The second retainer 64 may be disposed along a second axis 100 and may have a body 102 and a flange 104 that may cooperate to define a second retainer hole 106. The body 102 may be generally cylindrical. An end of the body 102 may be received in the second reinforcement plate hole 82. The flange 104 may be disposed at an end of the body 102 that is disposed proximate the cover plate 76. The flange 104 may extend away from the first axis 90 and may engage the cover plate 76 to inhibit axial movement of the second retainer 64. As is best shown in FIG. 4, a fastener 98 may extend through the second retainer hole 106 to couple the latch mechanism 44 to the second seat back portion 32 or a mounting bracket. The second axis 100 may be disposed above the first axis 90.

Figure 9:
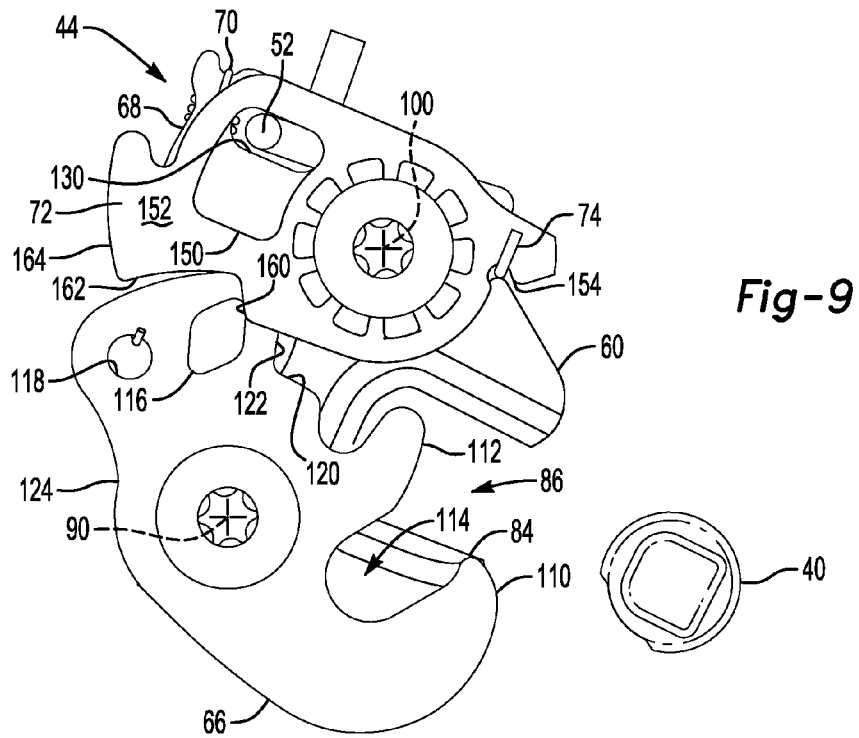
FIG. 9 is a reverse side view of the latch mechanism and the striker shown in FIG. 8 with a cover plate removed.

Referring to FIGS. 6-9, the pawl 66 may be disposed between the reinforcement plate 60 and the cover plate 76. The pawl 66 may be rotatably disposed on the first retainer 62 and may be configured to rotate about the first axis 90 between an open position and a closed position. The pawl 66 may receive and secure the striker 40 when in the closed position (i.e., when the latch mechanism 44 is in the closed condition). The pawl 66 may not receive and secure the striker 40 when in the open position (i.e., when the latch mechanism 44 is in the open condition). As is best shown in FIGS. 8 and 9, the pawl 66 may have a hook portion 110, a hook protrusion 112, an opening 114, a pin 116, a hole 118, a first contact surface 120, a second contact surface 122, and a perimeter 124.

Figure 11:
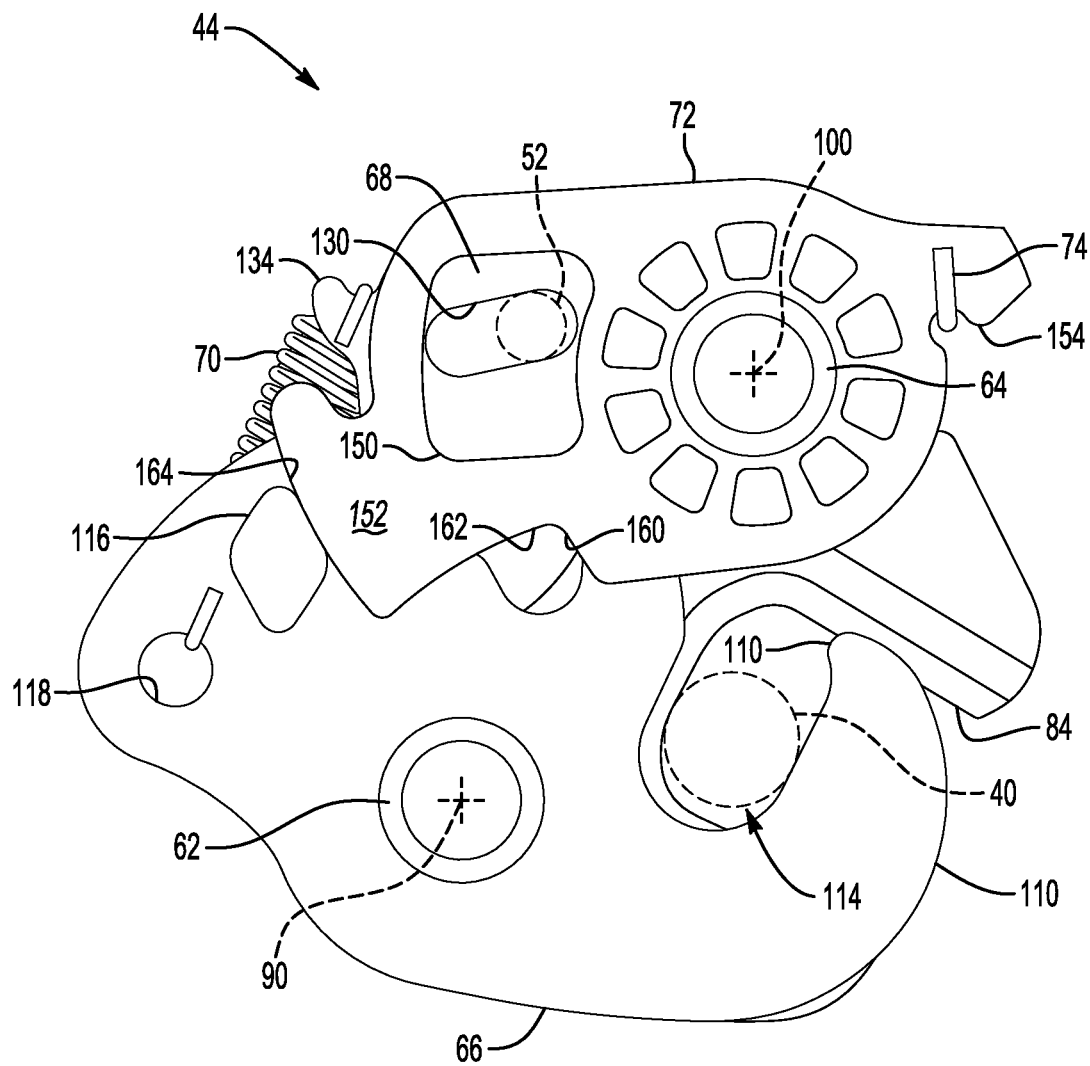
FIG. 11 is a reverse side view of the latch mechanism and the striker shown in FIG. 10 with the cover plate removed.

The hook portion 110 may be disposed at an end of the pawl 66. The hook portion may be disposed below the notch 84 on the reinforcement plate 60 when the pawl 66 is in the open position as shown in FIG. 9 and may be disposed proximate or above the top of the notch 84 when the pawl 66 is in the closed position as shown in FIG. 11.

The hook protrusion 112 may be disposed on an opposite side of the opening 114 from the hook portion 110. As such, the hook protrusion 112 may be disposed closer to the first axis 90 than the hook portion 110. The hook protrusion 112 may be disposed in the striker receiving opening 86 when the latch mechanism 44 is in the open condition such that the striker 40 may engage the hook protrusion 112 to actuate the pawl 66 from the open position to the closed position as will be discussed in more detail below.

The opening 114 may be disposed between and may be defined by the hook portion 110 and the hook protrusion 112. The opening 114 may receive the striker 40 when the pawl 66 is in the closed position.

Referring to FIG. 9, the pin 116 may extend from a side of the pawl 66 in a direction that may extend away from the reinforcement plate 60 and toward the cover plate 76. For example, the pin 116 may extend toward the cover plate 76 and may extend toward and may engage the clamping cam 72. In addition, the clamping cam 72 and the pawl 66 may engage only at the pin 116 in one or more embodiments. In at least one embodiment, the pin 116 may have a substantially diamond shape.

The hole 118 may be generally disposed proximate an end of the pawl 66 that may be located opposite the hook portion 110. The hole 118 may facilitate coupling of the first biasing member 70 to the pawl 66.

Figure 10:
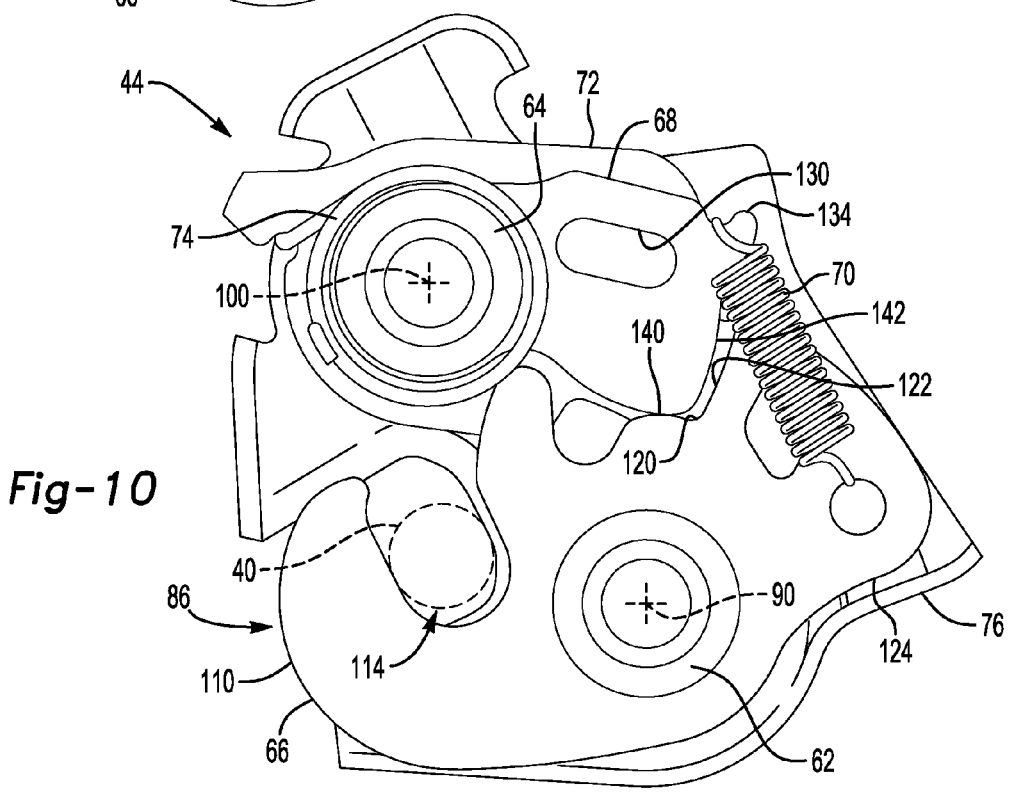
FIG. 10 is a side view of the latch mechanism in a closed condition with the reinforcement plate removed.

The first contact surface 120 may be disposed between the hook protrusion 112 and the second contact surface 122. The first contact surface 120 may not engage the catching cam 68 when the pawl 66 is in the open position as shown in FIG. 9 and may engage the catching cam 68 when the pawl 66 is in the closed position as shown in FIG. 10. The first contact surface 120 may be radially disposed with respect to the first axis 90 in one or more embodiments.

The second contact surface 122 may extend from an end of the first contact surface 120. The second contact surface 122 may extend away from the first axis 90 and may have a greater length than the first contact surface 120. The second contact surface 122 may normally be spaced apart from and may not engage the catching cam 68 when the pawl 66 is in either the open position or the closed position as shown in FIGS. 9 and 10, respectively. The second contact surface 122 may engage the catching cam 68 when the latch mechanism 44 is in the closed condition if the latch mechanism 44 is deformed, distorted or bent, such as may occur in response to a vehicle impact event.

The perimeter 124 or perimeter surface may define an outer border or boundary of the pawl 66 when viewed from the side, or from substantially perpendicular to the second axis 100. The perimeter 124 may extend continuously around the pawl 66 and may include the first contact surface 120 and the second contact surface 122 and may outline or define at least a portion of the hook portion 110 and the hook protrusion 112. The pin 116 and the hole 118 may be completely spaced apart from the perimeter 124 and may be disposed closer to the first axis 90 than the perimeter 124.

Referring to FIG. 6, the catching cam 68 may be disposed between the reinforcement plate 60 and the cover plate 76. The catching cam 68 may be rotatably disposed on the second retainer 64 and may be configured to rotate about the second axis 100. The catching cam 68 may be aligned with or may be disposed in a common plane with the pawl 66. More specifically, the catching cam 68 may be substantially aligned with the first contact surface 120 and the second contact surface 122 of the pawl 66. As is best shown in FIGS. 8 and 10, the catching cam 68 may have an actuating shaft opening 130, a pawl engaging portion 132, and a retention feature 134.

The actuating shaft opening 130 may receive the actuating shaft 52. As such, the actuating shaft 52 may engage or exert force upon a surface of the catching cam 68 that defines at least a portion of the actuating shaft opening 130 when the release handle 50 is actuated.

The pawl engaging portion 132, which is best shown in FIG. 10, may engage and may slide along a surface of the pawl 66. The pawl engaging portion 132 may be configured to engage the pawl 66 and may inhibit opening of the latch mechanism 44 in the event of damage or distortion of one or more components of the latch mechanism 44, such as may occur during a vehicle impact event. As such, the catching cam 68 may provide a secondary or backup mechanism that may help hold the pawl 66 and the latch mechanism 44 in the closed condition. In at least one embodiment, the pawl engaging portion 132 may have a first pawl engaging surface 140 and a second pawl engaging surface 142.

The first pawl engaging surface 140 may face toward the pawl 66. As is best shown in FIG. 8, the first pawl engaging surface 140 may be spaced apart from and may not engage the pawl 66 when the pawl 66 is in the open position. As is best shown in FIG. 10, the first pawl engaging surface 140 may be disposed proximate and may engage the first contact surface 120 when the pawl 66 is in the closed position.

The second pawl engaging surface 142 may extend from an end of the first pawl engaging surface 140. For example, the second pawl engaging surface 142 may extend from the first pawl engaging surface 140 to the retention feature 134. The second pawl engaging surface 142 may be disposed further away from the second axis 100 than the first pawl engaging surface 140. In addition, the second pawl engaging surface 142 may extend along a curve or arc and may be radially disposed with respect to the second axis 100. The second pawl engaging surface 142 may normally be spaced apart from and not engage the catching cam 68 when the pawl 66 is in either the open position or the closed position. The second pawl engaging surface 142 may engage the second contact surface 122 of the catching cam 68 when the pawl 66 is in the closed position and the latch mechanism 44 was deformed or bent, such as may occur in response to a vehicle impact event, to inhibit rotation of the pawl 66. As such, the catching cam 68 may not inhibit rotation of the pawl 66 unless the latch mechanism 44 is deformed.

The retention feature 134 may facilitate coupling of the first biasing member 70 to the catching cam 68. The retention feature 134 may have any suitable configuration. For instance, the retention feature 134 may have a male configuration, such as a protrusion or hook, or may have a female configuration, such as a hole. In the embodiment shown, the retention feature 134 is configured as a hook that extends from an end of the catching cam 68. The retention feature 134 may be disposed further from the second axis 100 than the actuating shaft opening 130.

The first biasing member 70 may extend from the pawl 66 to the catching cam 68. The first biasing member 70 may have any suitable configuration. For instance, the first biasing member 70 may be a spring, such as a tension spring. In at least one embodiment, the first biasing member 70 may have a first end and a second end. The first end may be received in the hole 118 of the pawl 66. The second end may be disposed opposite the first end and may engage the retention feature 134 of the catching cam 68. Force exerted by the first biasing member 70 may help hold the pawl engaging portion 132 of the catching cam 68 against the pawl 66 when the latch mechanism 44 is in the closed condition. In addition, the first biasing member 70 may urge the pawl 66 to rotate from the closed position toward the open position when the actuating shaft 52 actuates the catching cam 68 away from the pawl 66.

Referring to FIG. 6, the clamping cam 72 may be disposed between the reinforcement plate 60 and the cover plate 76. More specifically, the clamping cam 72 may be disposed between the catching cam 68 and the cover plate 76. The clamping cam 72 may be rotatably disposed on the second retainer 64 and may be configured to rotate about the second axis 100. The clamping cam 72 may be aligned with or may be disposed in a common plane with the pin 116 of the pawl 66. As is best shown in FIGS. 9 and 11, the clamping cam 72 may have an actuating shaft opening 150, a pin engaging portion 152, and a retention feature 154.

The actuating shaft opening 150 may receive the actuating shaft 52. As such, the actuating shaft 52 may engage or exert force upon a surface of the clamping cam 72 that defines at least a portion of the actuating shaft opening 150 when the release handle 50 is actuated. The actuating shaft opening 150 of the clamping cam 72 may be larger than the actuating shaft opening 130 of the catching cam 68.

The pin engaging portion 152 may engage and may slide along the pin 116. In addition, the pin engaging portion 152 and the pin 116 may engage to inhibit rotation of the pawl 66 in various positions. The pin engaging portion 152 may have a plurality of surfaces that may engage the pin 116, such as a first pin engaging surface 160 and a second pin engaging surface 162, and a third pin engaging surface 164.

The first pin engaging surface 160 may face toward the pin 116 and generally toward the first axis 90. The first pin engaging surface 160 may be slightly curved or generally linear in one or more embodiments. The first pin engaging surface 160 may be disposed closer to the second axis 100 than the third pin engaging surface 164. As is best shown in FIG. 9, the first pin engaging surface 160 may be disposed proximate and may engage the pin 116 when the pawl 66 is in the open position. As is best shown in FIG. 11, the first pin engaging surface 160 may be spaced apart from and may not engage the pin 116 when the pawl 66 is in the closed position.

The second pin engaging surface 162 may extend from the first pin engaging surface 160 to the third pin engaging surface 164. For example, the second pin engaging surface 162 may extend from an end of the first pin engaging surface 160 to an end of the third pin engaging surface 164. The second pin engaging surface 162 may extend away from the second axis 100 and may have a greater length than the first pin engaging surface 160. In addition, the second pin engaging surface 162 may be curved and may be concave between the first pin engaging surface 160 and the third pin engaging surface 164. The second pin engaging surface 162 may be spaced apart from the pin 116 when the pawl 66 is in the open position and in the closed position, as shown in FIGS. 9 and 11, respectively. The second pin engaging surface 162 may engage the pin 116 when the pawl 66 moves from the open position toward the closed position.

The third pin engaging surface 164 may extend from an end of the second pin engaging surface 162. As such, the third pin engaging surface 164 may be spaced apart from the first pin engaging surface 160. The third pin engaging surface 164 may extend away from the pawl 66 and may be curved. For instance the third pin engaging surface 164 may be convex with respect to the second axis 100 and the second pin engaging surface 162. As is best shown in FIG. 9, the third pin engaging surface 164 may be spaced apart from and may not engage the pin 116 when the pawl 66 is in the open position. As is best shown in FIG. 11, the third pin engaging surface 164 may be disposed proximate and may engage the pin 116 when the pawl 66 is in the closed position.

The retention feature 154 may facilitate coupling of the second biasing member 74 to the clamping cam 72. The retention feature 154 may have any suitable configuration. For instance, the retention feature 154 may have a male configuration, such as a protrusion or hook, or may have a female configuration, such as a hole. In the embodiment shown, the retention feature 154 is configured as a hook that extends from an end of the clamping cam 72.

Referring to FIGS. 8 and 10, the second biasing member 74 may extend from the clamping cam 72 to the cover plate 76. The second biasing member 74 may have any suitable configuration. For instance, the second biasing member 74 may be a spring, such as a helical spring that may be disposed on and extend around the second retainer 64. In at least one embodiment, the second biasing member 74 may have a first end and a second end. The first end may be received in the retention feature 154 of the clamping cam 72. The second end may be disposed opposite the first end and may engage the reinforcement plate 60. The first and second ends may be disposed at a substantially constant radial distance from the second axis 100 and may not slide along a surface of the reinforcement plate 60 or the clamping cam 72. Force exerted by the second biasing member 74 may bias the clamping cam 72 toward the pawl 66.

Referring to FIGS. 5-7, the cover plate 76, may be disposed opposite the reinforcement plate 60. As such, the cover plate 76 may face toward the first seat back portion 30 of the seat back frame 20. The cover plate 76 may be fixedly positioned with respect to the reinforcement plate 60. The cover plate 76 may have a first hole that may receive the first retainer 62 and a second hole that may receive the second retainer 64. As such, the cover plate 76 may not rotate with respect to the reinforcement plate 60, the first retainer 62, and the second retainer 64.

Referring to FIG. 7, the cover plate 76 may have a first cover plate hole 170 and a second cover plate hole 172. The first cover plate hole 170 may receive the first retainer 62. The second cover plate hole 172 may be spaced apart from the first cover plate hole 170 and may receive the second retainer 64. The cover plate 76 may have a roughly C-shaped configuration that may include a cover plate notch 174 or opening that may be generally disposed between the first cover plate hole 170 and the second cover plate hole 172 and that may receive the striker 40. The cover plate notch 174 may cooperate with the notch 84 on the reinforcement plate 60 to at least partially define the striker receiving opening 86. The cover plate 76 may be made of any suitable material, such as a metal or metal alloy. The cover plate 76 may be made of any suitable material, such as a metal or metal alloy, and may not include any deformable stops that may engage the striker 40 or that may be made of a second material that may be more deformable than the metal or metal alloy.

Referring to FIGS. 5-11, operation of the latch release mechanism 42 and the latch mechanism 44 will now be described in more detail starting with the latch mechanism 44 in the open condition.

In FIGS. 5, 8 and 9, the latch mechanism 44 is shown in the open condition and is ready to receive the striker 40. (In FIGS. 8 and 9, the first seat back portion 30 is not shown for clarity.) As is best shown in FIG. 8, the actuating shaft 52 may engage the clamping cam 72 when the pawl 66 is in the open position. The pawl 66 is rotated such that that the hook portion 110 may not be disposed in the striker receiving opening 86 so that the striker 40 may engage the hook protrusion 112 when the second seat back portion 32 is rotated to the seating position or into engagement with the latch mechanism 44. As such, the opening 114 of the pawl 66 may be disposed below the striker 40 when the pawl 66 is in the open position. As shown in FIG. 9, the pin 116 of the pawl 66 may engage the first pin engaging surface 160 of the clamping cam 72 to hold the pawl 66 stationary in the open position until the striker 40 engages the hook protrusion 112 and exerts sufficient force upon the hook protrusion 112 to rotate the pawl 66 about the first axis 90.

Engagement of the striker 40 and the hook protrusion 112 may cause the pawl 66 to rotate about the first axis 90 to the closed position shown in FIGS. 6, 7, 10 and 11. The pawl 66 may rotate about the first axis 90 such that the hook portion 110 moves upward into the striker receiving opening 86 or toward the second axis 100 so that the striker 40 may be received in the opening 114 of the pawl 66. In the closed position, the striker 40 may be pinched between the hook portion 110 on one side and the reinforcement plate 60 and cover plate 76 on an opposite side. As such, the reinforcement plate 60, cover plate 76, and pawl 66 may cooperate to secure the striker 40.

Rotation of the pawl 66 about the first axis 90 to the closed position may cause the pin 116 to move from the position shown in FIG. 9 to the position shown in FIG. 11. For instance, the pin 116 may slide along the first pin engaging surface 160 of the clamping cam 72 to the second pin engaging surface 162 and then along the second pin engaging surface 162 to the third pin engaging surface 164 to the position shown in FIG. 11. The pawl 66 may be inhibited from rotating about the first axis 90 when the pin 116 engages the third pin engaging surface 164. As such, the striker 40 may remain captured in the opening 114 of the pawl 66. Rotation of the pawl 66 about the first axis 90 to the closed position may also stretch the first biasing member 70, which in turn may exert force on the catching cam 68 to rotate the catching cam 68 about the second axis 100 from the position shown in FIG. 8 to the position shown in FIG. 10. As is best shown in FIG. 10, the first pawl engaging surface 140 of the catching cam 68 may engage the first contact surface 120 of the pawl 66 when the pawl 66 is in the closed position. As is best shown in FIG. 11, the actuating shaft 52 may be spaced apart from the clamping cam 72 and may not engage the clamping cam 72 when the pawl 66 in the closed position.

The latch mechanism 44 may move from the closed condition to the open condition in response to force exerted on the release handle 50. More specifically, pulling the release handle 50 may actuate or rotate the actuating shaft 52, which may cause the actuating shaft 52 to move from the position shown in FIG. 11 to the position shown in FIG. 9. As such, the actuating shaft 52 may engage the catching cam 68 and may initially rotate the catching cam 68 about the second axis 100 while the clamping cam 72 remains stationary. As such, the catching cam 68 may disengage the pawl 66 before the actuating shaft 52 engages the clamping cam 72 and before the clamping cam 72 rotates about the second axis 100. In addition, rotation of the catching cam 68 may extend or stretch the first biasing member 70 before the actuating shaft 52 engages the clamping cam 72.

After sufficient rotation, the actuating shaft 52 may engage and rotate the clamping cam 72. The force exerted by the actuating shaft 52 may cause the catching cam 68 and the clamping cam 72 to rotate in a common direction about the second axis 100. As such, the catching cam 68 may rotate away from the pawl 66, which may increase the force exerted by the first biasing member 70 on the pawl 66. The pawl 66 may be temporarily inhibited from rotating about the first axis 90 while the third pin engaging surface 164 of the clamping cam 72 remains engaged with the pin 116 as shown in FIG. 11. Once the clamping cam 72 rotates a sufficient distance, the pin 116 may disengage the third pin engaging surface 164, the pawl 66 may rotate about the first axis 90, and the pin 116 may slide along the second pin engaging surface 162 under the biasing force of the first biasing member 70 back to the open position shown in FIGS. 8 and 9 such that the striker 40 may exit the latch mechanism 44 and the second seat back portion 32 may be free to rotate about the axis 36 toward the folded position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a first seat back portion that is pivotable about an axis and has a striker;
a second seat back portion that is pivotable about the axis and is disposed adjacent to the first seat back portion;
a latch release mechanism that is disposed on the second seat back portion and includes an actuating shaft; and
a latch mechanism that is disposed on the second seat back portion, the latch mechanism including:
a pawl that rotates about a first axis;
a catching cam that rotates about a second axis and has an actuating shaft opening that receives the actuating shaft; and
a clamping cam that rotates about the second axis and has an actuating shaft opening that receives the actuating shaft;
wherein the actuating shaft engages and rotates the catching cam before engaging and rotating the clamping cam to actuate the pawl from a closed position to an open position.

2. The seat assembly of claim 1 wherein the seat assembly further comprises a third seat back portion that is pivotable about the axis, wherein the second seat back portion is disposed between the first seat back portion and the third seat back portion.

3. The seat assembly of claim 1 wherein the first seat back portion and the second seat back portion rotate together about the axis when the striker is received in the latch mechanism and the second seat back portion rotates independently from the first seat back portion when the striker is not received in the latch mechanism.

4. The seat assembly of claim 1 wherein the actuating shaft opening of the clamping cam is larger than the actuating shaft opening of the catching cam.

5. The seat assembly of claim 1 wherein the actuating shaft engages the catching cam when the pawl is in the open position.

6. The seat assembly of claim 5 wherein the actuating shaft does not engage the clamping cam when the pawl is in the closed position.

7. The seat assembly of claim 1 wherein the catching cam disengages the pawl before the actuating shaft engages the clamping cam.

8. The seat assembly of claim 1 further comprising a first biasing member that extends from the catching cam to the pawl, wherein the first biasing member urges the pawl to rotate from the closed position toward the open position when the actuating shaft actuates the catching cam.

9. The seat assembly of claim 8 wherein the first biasing member is extended before the actuating shaft engages the clamping cam.

10. The seat assembly of claim 8 wherein the catching cam has a retention feature that is disposed further from the second axis than the actuating shaft opening of the catching cam and the first biasing member is coupled to the retention feature.

11. A seat assembly comprising:
a first seat back portion that is pivotable about an axis and has a striker;
a second seat back portion that is pivotable about the axis;
a latch release mechanism that is disposed on the second seat back portion and includes a release handle and an actuating shaft; and
a latch mechanism that includes:
a reinforcement plate that is disposed on the second seat back portion;
a cover plate that is fixedly positioned with respect to the reinforcement plate;
a pawl that is disposed between the reinforcement plate and the cover plate, wherein the pawl moves between an open position and a closed position and has a pin that is spaced apart from a perimeter of the pawl;
a catching cam that is disposed between the reinforcement plate and the cover plate and engages the pawl when the pawl is in the closed position; and a clamping cam that is disposed between the catching cam and the cover plate, wherein the clamping cam engages the pin to inhibit rotation of the pawl, wherein the pawl rotates about a first axis and the clamping cam and the catching cam rotate about a second axis.

12. The seat assembly of claim 11 wherein the pin extends toward the cover plate and the clamping cam engages the pawl only at the pin.

13. The seat assembly of claim 11 wherein the second axis is disposed above the first axis.

14. The seat assembly of claim 13 wherein the catching cam has an actuating shaft opening and a retention feature that is disposed further from the second axis than the actuating shaft opening, wherein the retention feature is coupled to a first biasing member that urges the catching cam toward the pawl.

15. The seat assembly of claim 13 wherein the clamping cam has a first pin engaging surface, a second pin engaging surface, and a third pin engaging surface, wherein the second pin engaging surface extends from the first pin engaging surface to the third pin engaging surface and the pin engages the first pin engaging surface when the pawl is in the open position and the pin engages the third pin engaging surface when the pawl is in the closed position.

16. The seat assembly of claim 15 wherein the first pin engaging surface is disposed closer to the second axis than the third pin engaging surface.

17. The seat assembly of claim 15 wherein the pin is spaced apart from the second pin engaging surface when the pawl is in the open position and when the pawl is in the closed position.

18. The seat assembly of claim 15 wherein the third pin engaging surface is spaced apart from the first pin engaging surface and is convex with respect to the second axis.

19. The seat assembly of claim 11 wherein the catching cam has a first pawl engaging surface and a second pawl engaging surface that extends from the first pawl engaging surface and the pawl has a first contact surface and a second contact surface that extends from the first contact surface, wherein the catching cam does not engage the pawl when the pawl is in the open position, and the first pawl engaging surface engages the first contact surface but the second pawl engaging surface does not engage the second contact surface when the pawl is in the closed position and the latch mechanism is not deformed.

20. The seat assembly of claim 19 wherein the catching cam does not prevent rotation of the pawl unless the latch mechanism deforms in response to a vehicle impact event.

* * * * *